May 31, 1932.  J. HUME  1,860,417
FLUID CONTROLLING DEVICE
Filed Dec. 15, 1928
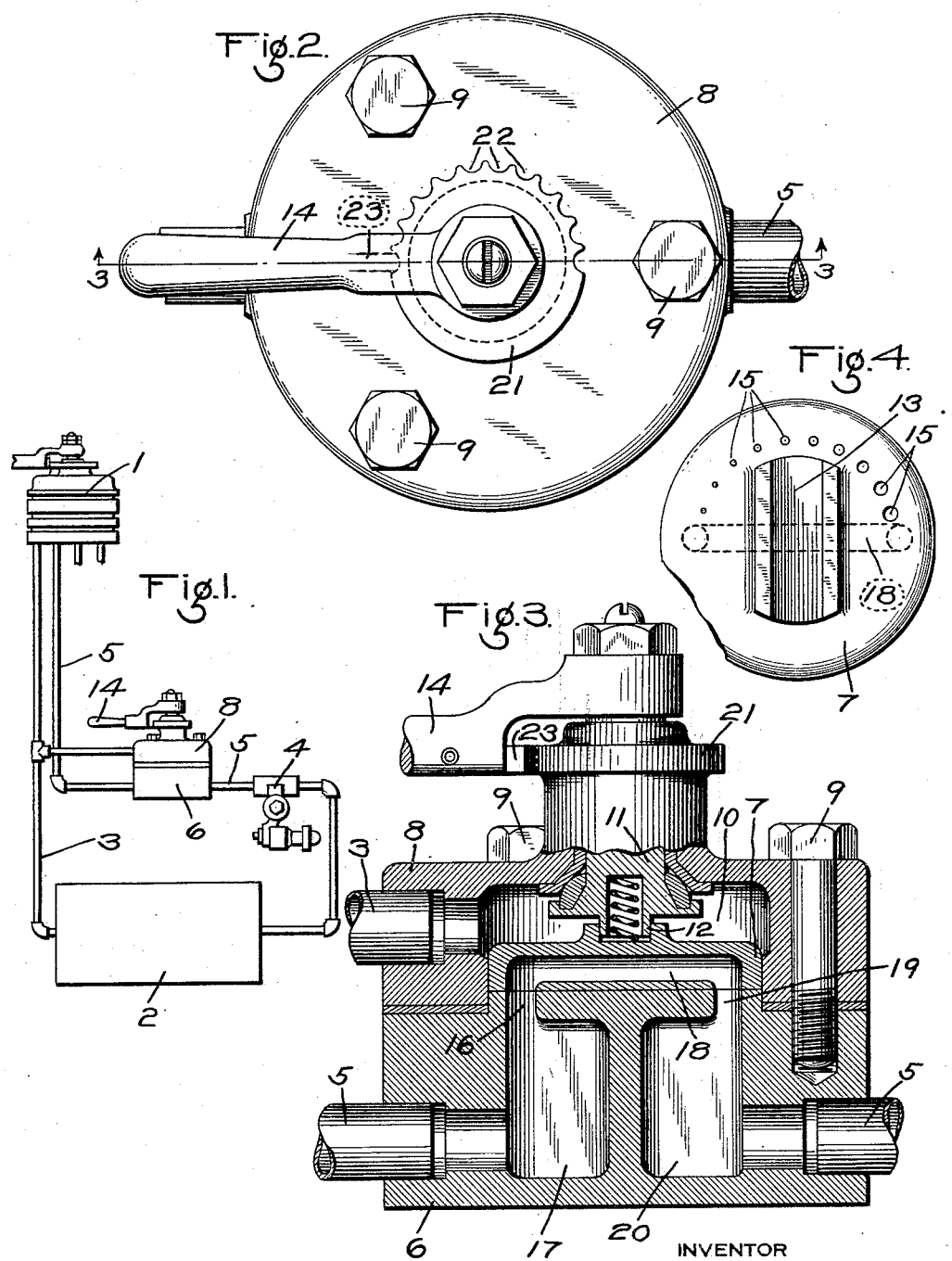
INVENTOR
JOHN HUME
BY *Wm. M. Cady*
ATTORNEY Patented May 31, 1932

1,860,417

UNITED STATES PATENT OFFICE

JOHN HUME, OF HOUSTON, TEXAS, ASSIGNOR TO THE WESTINGHOUSE AIR BRAKE COMPANY, OF WILMERDING, PENNSYLVANIA, A CORPORATION OF PENNSYLVANIA

FLUID CONTROLLING DEVICE

Application filed December 15, 1928. Serial No. 326,306.

This invention relates to fluid pressure brakes, and more particularly to means for testing the extent of leakage of fluid under pressure from the brake pipe of the fluid pressure brake system.

The principal object of my invention is to provide means associated with the fluid pressure brake system whereby the engineer may at any time test the extent of leakage of fluid under pressure from the brake pipe.

If the engineer finds that the leakage is excessive, he can report the same when the train arrives at a station or other terminal, so that the excessive leakage may be stopped after the train has been inspected and the leaks located.

In the accompanying drawings, Fig. 1 is a diagrammatic view of a portion of the locomotive fluid pressure brake equipment, showing my invention embodied therein; Fig. 2 a plan view of the leakage testing device; Fig. 3 a section on the line 3—3 of Fig. 2; and Fig. 4 a plan view of the rotary valve of the leakage testing device.

The fluid pressure brake apparatus shown in Fig. 1 comprises the usual engineer's brake valve device 1, a main reservoir 2, connected by pipe 3 with the brake valve device, and the usual feed valve device 4, adapted to supply fluid at a reduced pressure through pipe 5 to the brake valve device 1, the brake valve device being adapted, in running position, to supply fluid under pressure from the feed valve device to the brake pipe, in the usual manner.

According to my invention, there is interposed in the pipe 5, a leakage testing device comprising a casing 6 having a valve seat at its upper face on which a rotary valve 7 seats. A cover plate 8 is secured to the casing 6 by bolts 9 and has a valve chamber 10 which contains the rotary valve 7.

Extending through a central bore in the cover plate 8 is an operating stem 11 having at its lower end a key section 12 adapted to engage in a transverse groove 13, formed on the upper face of the rotary valve 7. A handle 14 is secured to the outer end of the stem 11 for rotating the stem and the rotary valve. The main reservoir pipe 3 is connected to the valve chamber 10 and the rotary valve 7 is provided with a series of through ports 15 of different flow areas and arranged to successively register with a port opening 16 in the valve seat which leads to a chamber 17 in the casing 6 connected to the brake valve side of pipe 5.

In one position of the rotary valve 7, a cavity 18 connects port 19 with port 16. The port 19 leads to a chamber 20 in the casing 6, which is connected to the feed valve side of pipe 5, so that when the rotary valve is in the above position, fluid under pressure is supplied from the feed valve device 4 to the brake valve device. In the other positions of the rotary valve, the feed valve connection is cut off.

A flange 21, associated with the sleeve portion 22 of the cover plate 8, is provided with a plurality of notches 22 corresponding with the different positions of the rotary valve 7 and adapted to be engaged by a spring pressed member 23, carried by the handle 14, so as to yieldingly lock the handle in its different positions.

The ports 15 are of such flow capacity that for a given number of cars in the train, the corresponding port will supply fluid under pressure at a sufficient rate to maintain the brake pipe pressure at the standard pressure carried, provided the leakage from the brake pipe is not excessive or above a predetermined amount. For example, the smallest port may be arranged to supply fluid for a 10 car train, and the next succeeding port for a 20 car train and so on.

In operation, the handle 14 of the testing device is normally set in the position shown in the drawing, so that cavity 18 connects ports 19 and 16 and consequently, fluid under pressure is supplied from the feed valve device 4 to the brake valve device and with the brake valve device in running position, fluid under pressure is supplied by the feed valve device to the usual brake pipe to maintain the pressure therein at the standard pressure carried.

If the engineer wishes to test the train for brake pipe leakage, he turns the handle 14 to a position corresponding with the number of cars he has in his train. He then watches the usual gage which indicated brake pipe pressure and if he finds that the brake pipe pressure is maintained at the standard pressure in this position, he will know that leakage from the brake pipe is not excessive. If the feed of fluid under pressure in this position is not sufficient to maintain the brake pipe pressure at the standard carried, he will know that there is excessive leakage from the brake pipe, so that when the train arrives at the next stop, he can report the matter and have the leaks located and stopped.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a fluid pressure brake system of a train, said system having a brake pipe, main reservoir and a feed valve device, of a valve device having a valve provided with ports for supplying fluid under pressure from the main reservoir to the brake pipe at different rates corresponding with the number of cars in the train and having a position for supplying fluid under pressure from the feed valve device to the brake pipe.

2. The combination with a fluid pressure brake system of a train, said system having a brake pipe, main reservoir and a feed valve device, of a valve device having a rotary valve provided with a plurality of ports of different flow areas adapted to supply fluid under pressure from the main reservoir to the brake pipe at different rates corresponding with the number of cars in the train and having a cavity for connecting the feed valve device to the brake pipe in one position of the valve.

In testimony whereof I have hereunto set my hand, this 5th day of December, 1928.

JOHN HUME.